No. 764,670. PATENTED JULY 12, 1904.
E. W. OLDS.
BRAKE FOR RAILWAY CARS.
APPLICATION FILED APR. 18, 1904.
NO MODEL.
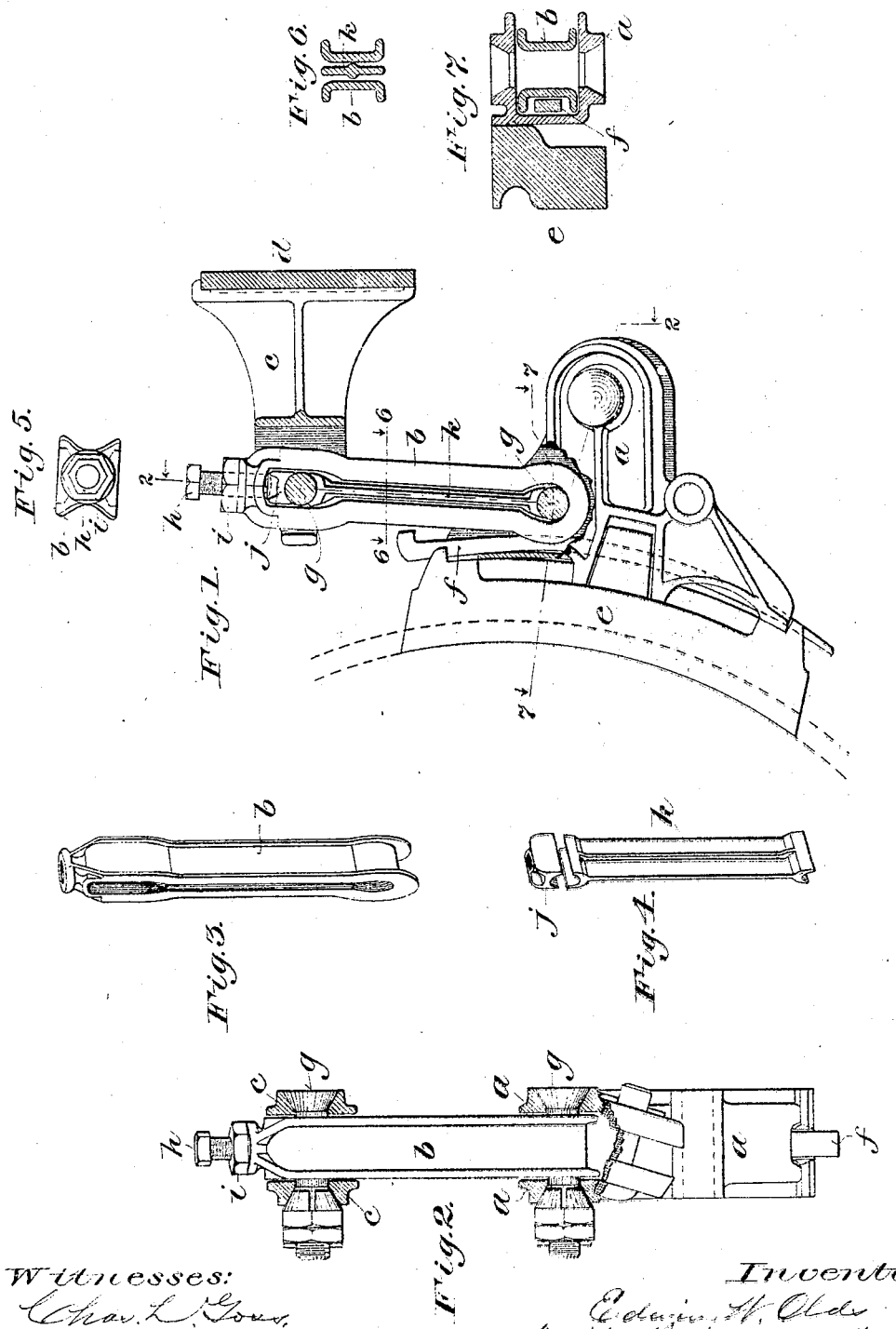
Witnesses:
Chas. L. Gour.
Bernard C. Roloff.
Inventor:
Edwin W. Olds
By Winkler Flanders Smith Bottum & Vilas
Attorneys.

No. 764,670.

Patented July 12, 1904.

UNITED STATES PATENT OFFICE.

EDWIN W. OLDS, OF MILWAUKEE, WISCONSIN.

BRAKE FOR RAILWAY-CARS.

SPECIFICATION forming part of Letters Patent No. 764,670, dated July 12, 1904.

Application filed April 18, 1904. Serial No. 203,622. (No model.)

*To all whom it may concern:*

Be it known that I, EDWIN W. OLDS, a citizen of the United States, residing at Milwaukee, in the county of Milwaukee and State of Wisconsin, have invented certain new and useful Improvements in Brakes for Railway-Cars, of which the following is a specification, reference being had to the accompanying drawings, forming a part thereof.

This invention relates more particularly to means for suspending or supporting the brake-shoes.

The main objects of the invention are to take up play in the hanger-joints, and thereby reduce wear and avoid rattling, to prevent the tilting and jerking of the trucks when the brakes are applied, and generally to improve the construction and operation of brakes of this class.

It consists, essentially, in certain novel features of construction and in the peculiar arrangement of parts hereinafter particularly described, and pointed out in the claims.

In the accompanying drawings, like letters designate the same parts in the several figures.

Figure 1 is a side elevation of a brake embodying my improvements, parts of the brake being broken away and shown in section. Fig. 2 is a rear elevation and vertical cross-section on the line 2 2, Fig. 1. Fig. 3 is an isolated perspective view of the hanger. Fig. 4 is a similar view of the space-piece and adjustable bearing-block. Fig. 5 is a plan or upper end view of the hanger; and Figs. 6 and 7 are cross-sections on the lines 6 6 and 7 7, respectively, of Fig. 1.

Referring to the drawings, $a$ is the brake-head, suspended by a link or hanger $b$ from a bracket $c$, which is attached to the transom $d$ or other convenient part of the truck-frame. The brake-shoe $e$ is detachably secured to the head $a$ by a key $f$ or in any other suitable way, or it may be made integral with the head. The head $a$ and the bracket $c$, which are pivotally connected by the hanger $b$, are recessed to receive the ends of the hanger and formed with horizontal bolt-holes intersecting the recesses and having conical seats at their ends, as shown in Figs. 2 and 7. Pivot-bolts $g$, having conical heads and conical washers or nuts fitted in said seats, are secured in the brake-head and bracket, as shown in Fig. 2, by nuts threaded on said bolts next to the conical washers or nuts. By turning up the nuts on the bolts $g$ the conical heads and washers or bearings are forced into their seats, thereby taking up any wear or play and preventing any rattling of said bolts in the supporting-bracket and brake-head. The hanger $b$ is longitudinally slotted or recessed and formed at the lower end of the slot or recess with a half-box or bearing, which is fitted to the under side of the pivot-bolt $g$ in the head $a$. An adjusting-bolt $h$, provided with a jam-nut $i$, is threaded in a longitudinal hole through the opposite end of the hanger. A half-box or adjustable bearing-block $j$, fitting the upper side of the pivot-bolt $g$ in bracket $c$, is seated against the tip of the adjusting-bolt $h$, as shown in Fig. 1.

$k$ is a space-piece loosely fitting with the bearing-block $j$ in the slot or recess of the hanger and formed at its ends, as shown in Figs. 1 and 4, with half-boxes or bearings which are fitted to the under and upper sides of the upper and lower pivot-pins $g$, respectively, and oppose the bearing in the lower end of the hanger and the adjustable bearing-block $j$ in the upper end thereof, as shown in Fig. 1.

By means of the adjusting-screw $h$, which is readily accessible from the outer side of the truck, all wear or play in both the pivot-bearings of the hanger is simultaneously taken up, the jam-nut $i$ being slackened, the adjusting-bolt turned down, and the jam-nut then tightened against its seat on the upper end of the hanger. The time and trouble usually required to adjust or refit in the usual way the separate joints or pivot-bearings in the supporting connections of brake-shoes, particularly in street-railway service, are saved by my improved construction and adjusting device, and the flattening of car-wheels, the rapid wear, and rattling of the brake supporting and actuating connections resulting from loose joints and play are to a great extent avoided.

Various changes in the minor details of construction and arrangement of parts for the adaptation of my improvements to car-brakes of various constructions may be made without departing from the principle and intended scope of the invention.

I claim—

1. In a railway-car brake the combination with a bracket and brake-head provided with pivot-bolts, of a longitudinally-slotted hanger provided at the ends of the slot therein with bearings one of which is adjustable lengthwise of the hanger, and a space-piece loosely fitting in said hanger and provided at the ends with bearings opposed to those in the hanger, substantially as described.

2. In a railway-car brake the combination with a brake-head and a hanger-support, each provided with a transverse pivot-bolt, of a hanger provided near its ends with bearings each of which is fitted to one side of one of said pivot-bolts and one of which is adjustable lengthwise of the hanger, and a space-piece provided at the ends with bearings fitted to said pivot-bolts on the sides opposite the bearings in the hanger, substantially as described.

3. In a railway-car brake the combination of a brake-head and a bracket each having a pair of opposing conical seats in line with each other, and pivot-bolts each having opposing conical bearings, one of which is adjustable, fitted in said seats, and a hanger having adjustable boxes fitted on said bolts, substantially as described.

4. In a railway-car brake the combination with a brake-head and a hanger-support each provided with a transverse pivot-bolt, of a longitudinally slotted or recessed hanger having a fixed bearing at one and an adjustable bearing-block at the other end fitted to said bolts, a space-piece having opposing bearings at the ends fitted to said bolts, and an adjusting-bolt threaded in a longitudinal hole in one end of the hanger and engaging said bearing-block, substantially as described.

In witness whereof I hereto affix my signature in presence of two witnesses.

EDWIN W. OLDS.

Witnesses:
CHAS. L. GOSS,
BERNARD C. ROLOFF.